(12) United States Patent
Taylor et al.

(10) Patent No.: US 6,461,457 B1
(45) Date of Patent: Oct. 8, 2002

(54) DIMENSIONALLY STABLE, BREATHABLE, STRETCH-THINNED, ELASTIC FILMS

(75) Inventors: Jack Draper Taylor, Roswell; Timothy Ray Martin, Alpharetta, both of GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/551,152

(22) Filed: Apr. 14, 2000

Related U.S. Application Data

(60) Provisional application No. 60/141,667, filed on Jun. 30, 1999.

(51) Int. Cl.[7] ............................ B29C 55/00; B29C 51/04
(52) U.S. Cl. .................... 156/73.1; 156/229; 156/272.2; 156/324; 264/164; 264/211.12; 264/231; 264/257; 264/288.4
(58) Field of Search ........................... 156/73.1, 73.4, 156/77, 90, 182, 244.11, 246, 229, 272.2, 290, 322; 264/257, 288.4

(56) References Cited

U.S. PATENT DOCUMENTS

| | | | |
|---|---|---|---|
| 3,338,992 A | 8/1967 | Kinney | |
| 3,341,394 A | 9/1967 | Kinney | |
| 3,502,763 A | 3/1970 | Hartmann | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,839,240 A | 10/1974 | Zimmerman | |
| 3,849,241 A | 11/1974 | Butin et al. | |
| 4,138,459 A | 2/1979 | Brazinsky et al. | |
| 4,340,563 A | 7/1982 | Appel et al. | |
| 4,384,023 A | 5/1983 | Okamura et al. | |
| 4,590,124 A | 5/1986 | Schoenberg | |
| 4,613,643 A | 9/1986 | Nakamura et al. | |
| 4,663,220 A | 5/1987 | Wisneski et al. | |
| 4,698,372 A | 10/1987 | Moss | |
| 4,820,590 A | 4/1989 | Hodgson, Jr. et al. | |
| 4,833,172 A | 5/1989 | Schwarz et al. | |
| 4,994,335 A | 2/1991 | Kamaei et al. | |
| 5,057,368 A | 10/1991 | Largman et al. | |

(List continued on next page.)

FOREIGN PATENT DOCUMENTS

| | | |
|---|---|---|
| EP | 419 742 | 4/1991 |
| EP | 432 755 | 6/1991 |
| EP | 602 613 | 6/1994 |
| EP | 452 727 | 3/1996 |
| EP | 800 808 | 10/1997 |
| GB | 2 103 537 | 2/1983 |
| GB | 2 115 702 | 9/1983 |
| WO | 94/00292 | 1/1994 |
| WO | 98/02610 | 1/1998 |
| WO | 98/29481 | 7/1998 |

*Primary Examiner*—Richard Crispino
*Assistant Examiner*—Sing P Chan
(74) *Attorney, Agent, or Firm*—Pauley Petersen Kinne & Erickson

(57) ABSTRACT

A method for producing a stretch-thinned elastic article having dimensional stability over time and at elevated temperatures in which a thermoplastic block copolymer is melt-processed into a stretchable article such as a film or fiber. The article is then conditioned at an elevated temperature greater than or equal to a glass transition temperature ($T_g$) of a hard phase of the thermoplastic block copolymer. The article is stretch-thinned at the elevated temperature to a desired percentage stretch, forming a stretch-thinned article, after which it is cooled to a temperature below the glass transition temperature of the hard phase of the thermoplastic block copolymer. Films produced by this method are suitable for use in durable and disposable articles including personal care articles such as diapers, incontinence wear, training pants, and feminine care articles, as well as wound dressings, wipes, towels, napkins, and protective apparel.

12 Claims, 2 Drawing Sheets

U.S. PATENT DOCUMENTS

| | | |
|---|---|---|
| 5,069,970 A | 12/1991 | Largman et al. |
| 5,073,316 A | 12/1991 | Bizen et al. |
| 5,169,712 A * | 12/1992 | Tapp ........................ 428/315.5 |
| 5,277,976 A | 1/1994 | Hogle et al. |
| 5,304,599 A | 4/1994 | Himes |
| 5,405,887 A | 4/1995 | Morita et al. |
| 5,451,450 A | 9/1995 | Erderly et al. |
| 5,466,410 A | 11/1995 | Hills |
| 5,789,065 A | 8/1998 | Haffner et al. |
| 5,814,390 A | 9/1998 | Stokes et al. |
| 5,853,638 A | 12/1998 | Han |
| 5,910,136 A * | 6/1999 | Hetzler et al. ............... 525/191 |

* cited by examiner

DIMENSIONALLY STABLE, BREATHABLE, STRETCH-THINNED, ELASTIC FILMS

This application claims benefit of U.S. Provisional Application No. 60/141,667 filed Jun. 30, 1999.

BACKGROUND OF THE INVENTION

1. Field of the Invention

This invention relates to a stretch-thinned article having dimensional stability over time and at elevated temperatures and a method for producing such a stretch-thinned article. More particularly, this invention relates to stretch-thinned films and laminates which can be used as components in durable and disposable articles. Disposable articles may include personal care articles such as diapers, incontinence wear, training pants, feminine care articles, etc. Components of such articles include side panels, outer covers, waist bands, supporting straps, absorbent wraps, stretchable liners and the like, etc. Also, articles such as wound dressings, wipes, towels, napkins, protective apparel, etc. can contain the films and laminates of this invention.

2. Description of Prior Art

The development of polymer films and processes for producing these films has continued to increase over the years. Such polymer films have numerous uses such as personal care articles such as diapers, incontinence wear, training pants and the like as well as articles such as wound dressings, wipes, protective apparel and the like. Depending upon the application, these films may be microporous so as to lend breathability to such articles and/or they may be laminated to other materials such as nonwovens so as to provide an effective barrier to the passage of body exudates while exhibiting good aesthetic and tactile properties, such as hand and feel.

One technique employed to achieve a satisfactory low-cost film has been to use films of increasingly lesser gauge or thickness. In addition to being lower in cost due to the reduced gauge, thinner films have increased softness. Such low gauge films are produced by drawing or stretching whereby the molecular structure of the polymer molecules is oriented within the film in the direction of stretching, thereby increasing the strength of the film in the stretched direction. However, one problem associated with such films is their general lack of dimensional stability over time, rendering them unsatisfactory for use in those applications requiring a high degree of dimensional stability. For example, for applications in which the films are cut to a specific size and then, sometime later, disposed in a location where the exact dimensions of the cut film must be met, shrinkage of the film prevents that cut film from being used. In addition, for films which are microporous, shrinkage of the films may reduce the size of the pores, thereby reducing the effectiveness of the pores as a means for passing water vapor and the like through the film and away from the wearer of articles comprising such films. Furthermore, dimensional stability of many stretch-thinned films is negatively impacted by exposure to elevated temperatures and, as thinner films are employed, the tendency of the films to break increases.

Accordingly, there is a need for a method for producing stretch-thinned films which address the issues set forth hereinabove and, in particular, stretch-thinned films having dimensional stability both over time and at elevated temperatures.

SUMMARY OF THE INVENTION

It is one object of this invention to provide a method for producing a stretch-thinned article, such as a film or fiber, which is dimensionally stable overtime and at elevated temperatures. That is, the article, after having been stretch-thinned retains its shape, even at elevated temperatures.

It is another object of this invention to provide a method for producing breathable films which are dimensionally stable both over time and at elevated temperatures.

These and other objects of this invention are addressed by a method for producing a stretch-thinned elastic article having dimensional stability over time and at elevated temperatures in which a thermoplastic block copolymer is melt-processed into an article, such as a film or fiber, and raised to a temperature equal to or greater than the glass transition temperature, $T_g$, of the hard phase of the thermoplastic block copolymer. The article is then stretch-thinned at the elevated temperature to a desired percentage stretch, forming a stretch-thinned article. The stretch-thinned article is then rapidly cooled to a temperature below the glass transition temperature of the hard phase of the thermoplastic block copolymer resulting in a dimensionally stable stretch-thinned article.

Depending upon the use of the article, the stretch-thinned article can be imparted with different characteristics directed for such usage. In accordance with one embodiment of this invention in which the stretch-thinned article is a film, the thermoplastic block copolymer is loaded with a filler, such as calcium carbonate particles, which produces a plurality of micropores in the film during stretch-thinning, resulting in a breathable stretch-thinned film.

BRIEF DESCRIPTION OF THE DRAWINGS

These and other objects and features will be better understood from the following detailed description taken in conjunction with the drawings wherein.

DESCRIPTION OF PREFERRED EMBODIMENTS

Definitions

Figure 1:
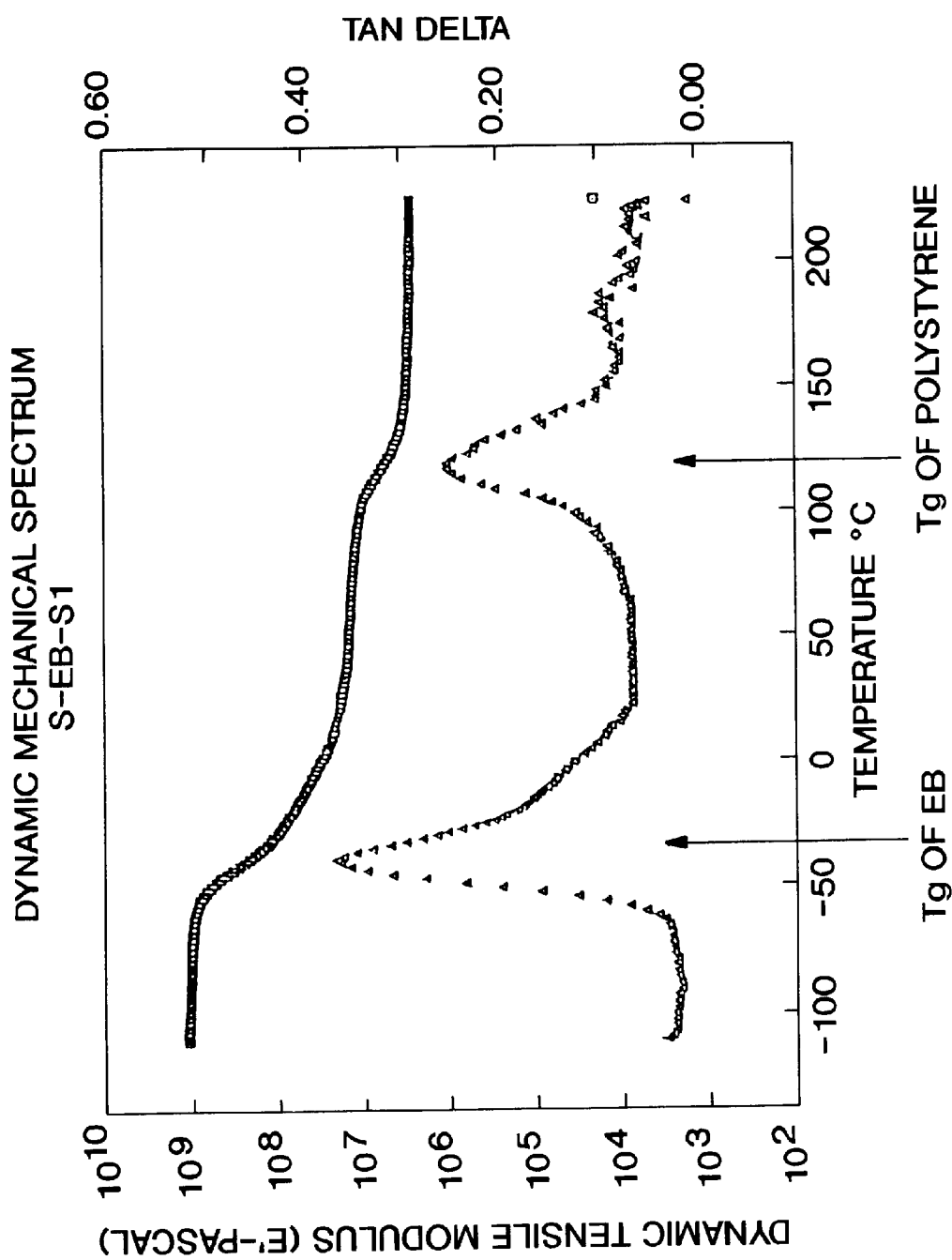
FIG. 1 is a diagram showing the dynamic mechanical spectrum for a thermoplastic block copolymer suitable for use in the method and articles of this invention.

As used herein, the term "polymer" generally includes, but is not limited to, homopolymers, copolymers, such as for example, block, graft, random and alternating copolymers, terpolymers, etc., and blends and modifications thereof. In addition, unless otherwise specifically limited, the term "polymer" also includes all possible geometric configurations of the molecule. These configurations include, but are not limited to, isotactic, syndiotactic, atactic and random symmetries.

As used herein, the term "nonwoven" means a material having a structure of individual fibers or threads which are interlaid, but not in an identifiable manner, as in a knitted fabric. Also included are airlaid materials and materials comprising pulp. Nonwoven fabrics or webs have been formed from many processes such as, for example, spunbonding processes, meltblowing processes, and bonded carded web processes. The basis weight of nonwoven fabrics is usually expressed in ounces of material per square yard (osy) or grams per square meter (gsm) and the fiber diameters are usually expressed in microns. (Note that to convert from osy to gsm, multiply osy by 33.91).

As used herein, the term "spunbond fibers" refers to small diameter fibers which are formed by extruding molten thermoplastic material as filaments from a plurality of fine, usually circular capillaries of a spinneret, with the diameter of the extruded filaments then being rapidly reduced as by, for example, in U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, and U.S. Pat. No. 3,542,615 to Dobo et al. Spunbond fibers are generally continuous and have average diameters (from a sample of at least 10) larger than 7 microns, more particularly, between about 10 and 30 microns. The fibers may also have shapes such as those described in U.S. Pat. No. 5,277,976 to Hogle et al., U.S. Pat. No. 5,466,410 to Hills, and U.S. Pat. No. 5,069,970 and U.S. Pat. No. 5,057,368 to Largman et al., which describe hybrids with unconventional shapes. A nonwoven web of spunbond fibers produced by melt spinning is referred to as a "spunbond".

As used herein, the term "meltblown fibers" means fibers formed by extruding a molten thermoplastic material through a plurality of fine, usually circular, die capillaries as molten threads or filaments into converging high velocity, usually hot, gas (for example, air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, by U.S. Pat. No. 3,849,241 to Butin et al. Meltblown fibers may be continuous or discontinuous and are generally smaller than 10 microns in average diameter when deposited onto a collecting surface.

As used herein, the term "machine direction" or "MD" means the length of a fabric in the direction in which it is produced. The term "cross machine direction" or "CD" means the width of fabric, that is a direction generally perpendicular to the MD.

To produce a stretch-thinned elastic article, such as a film or fiber or other useful article, having dimensional stability both over time and at elevated temperature in accordance with this invention, a thermoplastic block copolymer, for example an ABA, ABAB, etc. block copolymer, is melt-processed to form the article. Although a thermoplastic non-elastic block copolymer may be used, a thermoplastic elastic block copolymer is preferred. The thermoplastic block copolymer comprises a hard phase and a soft phase. The temperature of the article is then raised to an elevated temperature greater than or equal to the glass transition temperature, $T_g$, of the hard phase of the thermoplastic block copolymer. The article is then stretch-thinned by any known film-stretching means at the elevated temperature to a desired percentage stretch, forming a stretch-thinned article. The stretch-thinned article is then rapidly cooled to a temperature below the glass transition temperature of the hard phase of the thermoplastic block copolymer, producing a stretch-thinned article which is dimensionally stable over time and at elevated temperatures. The final article, for example film, has good stretch and recovery elastic properties because the soft phase of the thermoplastic block copolymer is above its glass transition temperature and, thus, is in its rubbery state.

Thermoplastic elastic block copolymers, e.g. a KRATON thermoplastic elastic block copolymer, SSSSSS-EBEBEBEBEBEB-SSSSSS, where "S" represents the hard phase, e.g. polystyrene, and "EB" represents the elastic soft phase, e.g. a polyolefin, can have a dynamic mechanical spectrum as shown in FIG. 1. The dynamic mechanical spectrum of FIG. 1 indicates the glass transition temperature of the EB elastomeric soft phase to be in the range of about −50 to −25° C. and the glass transition temperature of the polystyrene hard phase to be in the range of about 95 to about 130° C.. This block copolymer is amorphous and, thus, has no true crystalline melting point, $T_m$, for either the soft phase or the hard phase.

Figure 2:
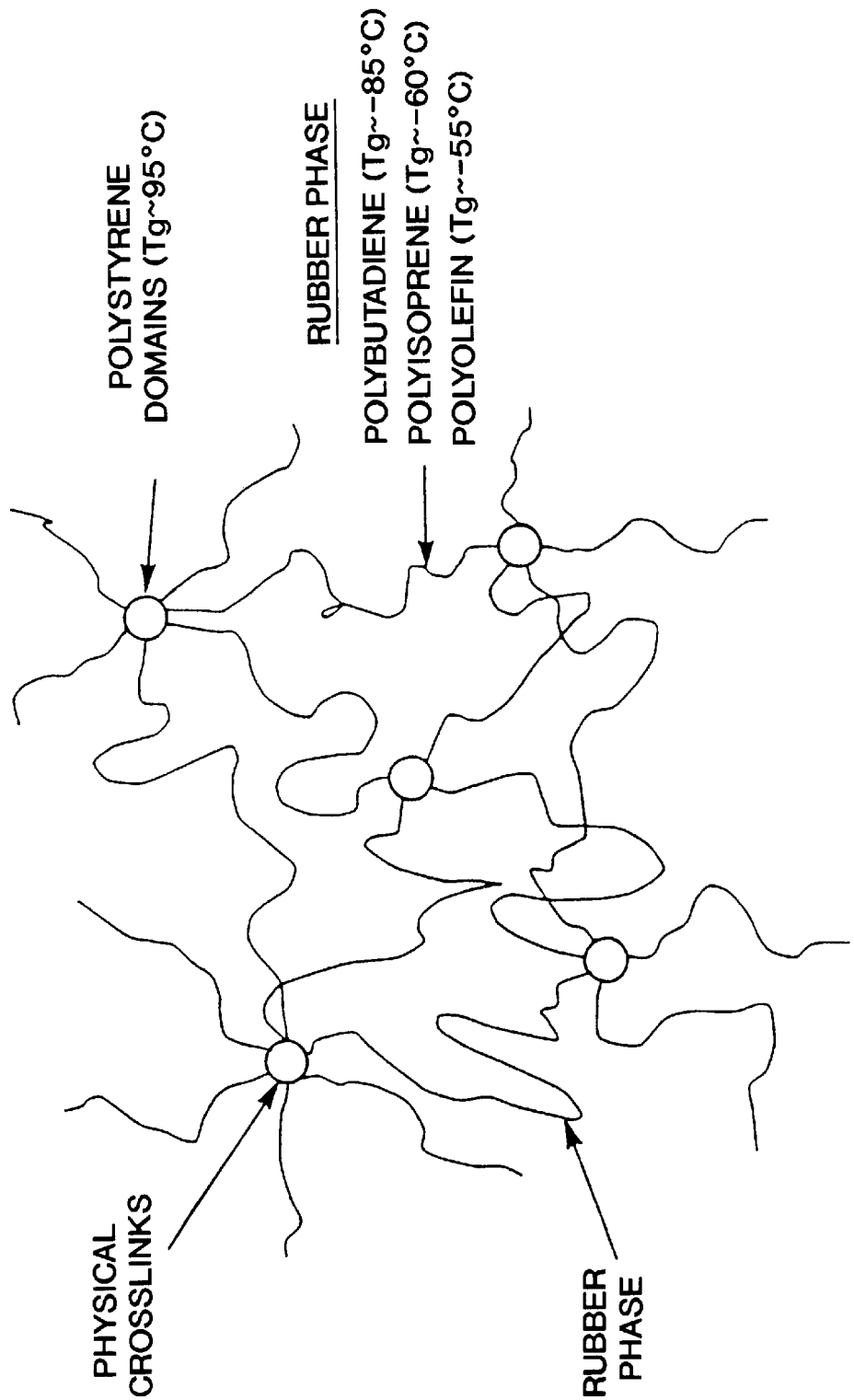
FIG. 2 is a diagram showing the glass transition temperature for the polystyrene hard segment of a thermoplastic rubber.

When this thermoplastic elastic block copolymer, normally with flow modifiers, adhesives, antioxidants, etc. added to make a typical processable compound, is heated to a temperature in the range of about 225 to about 260° C., the compound melts and flows. The compound can then be extruded into useful articles such as fibers and films. When these articles are cooled to room temperature, for example about 25° C., the thermoplastic elastomer imparts good stretch and recovery to the articles. This is because the elastomeric soft phase is above its glass transition temperature and, thus is in its rubbery state, while the polystyrene hard phase is below its glass transition temperature and, thus, is in its glassy state. In addition, as shown in FIG. 2, the thermoplastic elastomer itself "microphase" separates. The polystyrene exists in domains with glass transition temperatures of about 95° C., which domains serve as physical cross-links for the "EB" rubber phase.

EXAMPLE

KRATON RP6588, available from Shell Chemical, which contains a tetrablock thermoplastic elastomer, SEPSEP, as its major component, was melt extruded into a film. This tetrablock thermoplastic elastomer is analogous to the previously mentioned SEBS polymer in its physical properties and behavior. At room temperature, the film had good stretch and recovery properties in both the cross machine direction (CD) and the machine direction (MD).

The extruded KRATON RP6588 film was 3 inches wide in the CD and was precision cut into specimens 3 inches long in the machine direction. Each specimen was mounted in instron jaws that were about 5 inches×1 inch with a gauge length of 1 inch and disposed in a chamber that could be heated to controlled temperatures. The specimen was oriented for stretching in the cross machine direction. The specimen, mounted in the instron jaws in the chamber, was heated to the desired temperature and held at that temperature for 2 minutes. The specimen was then stretched, at a crosshead speed of 1 inch/minute, to the desired percentage stretch and held at the percentage stretch for 2 minutes. The heated chamber door was then opened, thereby turning off the heat, and a hand held fan was directed toward the stretched specimen to quickly cool it in the stretched condition. This cooling operation was carried out for 4 minutes. The jaws were then returned to their original 1 inch gauge length and the specimen removed. During the cooling cycle, marks were drawn on the film at the inside edges of the jaws. After removal of the specimen, the distance between the two marks was immediately measured to determine the immediate percent set in the film. The results from several specimens under different conditions are shown in Table 1.

TABLE 1

| Sample No. | Temperature of Stretch Test, ° C. | Target % | Observations During Stretching, Annealing, Cooling | Distance Between Marks After Relaxing Film | Immediate % Set |
| --- | --- | --- | --- | --- | --- |
| 1 | 25° C. | To Break | @1 inch/min = 1,071% | | |
| 2 | 25° C. | 400% (1 in. to 5 in.) | Did not break at any time at 400% | 1-⅝ in. | 62.5 |

TABLE 1-continued

| Sample No. | Temperature of Stretch Test, °C. | Target % | Observations During Stretching, Annealing, Cooling | Distance Between Marks After Relaxing Film | Immediate % Set |
|---|---|---|---|---|---|
| 3 | 25° C. | 400% | Did not break at any time at 400% | 1-½ in. | 50 |
| 4 | 40° C. | 400% | Did not break at any time at 400% | 1-15/16 in. | 93.8 |
| 5 | 40° C. | 400% | Did not break at any time at 400% | 1-¾ in. | 75 |
| 5A | 40° C. | 400% | Did not break at any time at 400% | 1-¾ | 75 |
| 6 | 50° C. | 400% | Did not break on way to 400%, but broke after 1 min. at 400% | | |
| 7 | 50° C. | 400% | Did not break at any time at 400% | 2-½ in. | 150 |
| 8 | 50° C. | 400% | Did not break at any time at 400% | 2-⅜ in. | 137.5 |
| 9 | 50° C. | 400% | Did not break at any time at 400% | 2-5/16 in. | 131 |
| 10 | 50° C. | 400% | Did not break at any time at 400% | 2-¼ in. | 125 |
| 11 | 60° C. | 400% | Broke at 396% | | |
| 12 | 60° C. | 400% | Did not break at any time at 400% | 2-⅞ in. | 187.5 |
| 13 | 60° C. | 400% | Broke at 301% | | |
| 14 | 60° C. | 300% | Broke at 275% | | |
| 15 | 60° C. | 300% | Broke at 265% | | |
| 16 | 60° C. | 225% | Did not break at any time at 225% | 2-⅛ in. | 112.5 |
| 17 | 60° C. | 225% | Broke at 189% | | |
| 18 | 75° C. | 400% | Broke at 200% | | |
| 19 | 75° C. | 400% | Broke at 255% | | |
| 20 | 105° C. | 400% | Did not break at any time at 400%. Very non-uniform neck-in. Film developed slack during 2 min. hold. | During cooling, film twisted and stuck to itself, becoming unusable. | |
| 21 | 105° C. | 200% | Did not break at any time at 200%. Necked-in uniformly to 1-¾ in. | 3 in. | 200 - Cooled film has good elastic properties when hand-stretched. |
| 22 | 105° C. | 200% | Did not break at any time at 200%. Necked-in uniformly to 1-27/32 in. | 3 in. | 200 - Cooled film has good elastic properties when hand-stretched in CD or MD |

The observations at 105° C. as shown in Table 1 were very unexpected and surprising. Because the films stretched at 60° C. and 75° C. usually broke when they were stretched 200% or more, it was expected that the films heated to 105° C. would break at low stretches. However, at 105° C., the films stretched uniformly with no tendency to break. It should be noted, as shown in FIG. 2, that 105° C. is slightly above the glass transition temperature of about 95° C. reported for the polystyrene hard segment. This may explain why the films stretched at 105° C. do not break and have a percent set equal to the percent stretch.

At 105° C., the polystyrene hard segments (or domains) are above their glass transition temperatures and, thus, are in their soft, rubbery state. Thus, the polystyrene domains can stretch or yield during stretching of the film. This stretching of the polystyrene domains relieves much of the stress on the soft segments during the stretching and keeps the soft segments from breaking. Then, when the film is rapidly cooled below 95° C. in the stretched state, the polystyrene hard segments return to their glassy state. And, when the film is allowed to relax by returning the instron jaws to their original 1 inch gauge length, the polystyrene domains are in their stiff glassy state, thereby preventing the bulk of the film from retracting. The cooled elastic soft segments, which are in a rubbery state, do not have enough retractive force to overcome the stiff polystyrene phase. As a result, the percent set in the relaxed film is equal to the original percent stretch, yet the fully set relaxed film has good elastic properties because the soft segments are in their rubbery state.

Based upon the results shown in Table 1, the various final relaxed films, when reheated, will either retain their final dimensions or retract in the direction opposite to the direction in which they were originally stretched because reheating supplies enough energy to the rubbery soft segments so that they will retract and gather the bulk of the film.

To determine which of these behaviors occurs for each of the respective relaxed films, the percent set after aging was determined for each specimen by measuring the distance between the two marks on each specimen after a given amount of time. Each specimen was then allowed to hang freely inside an air circulating oven at 85° C. for two minutes. The percent set after heating was then determined for each specimen by measuring the distance between the two marks on each specimen after it was removed from the oven. Finally, the total percent retraction was calculated for each specimen after it was removed from the oven. Total percent retraction is calculated as follows:

$$Total\%Retraction = \left(\left(\frac{ImmediateSetLength - HeatActualLength}{ImmediateSetLength - 1}\right)\right) * 100$$

The results are shown in Table 2.

TABLE 2

| Sample No. | Temperature of Stretch Test, °C. | Immediate % Set | % Set After Aging (Time) | % Set After Heating in Oven for 2 min. At 85° C. | Total % Retraction - ((Immediate Set Length - Heat Actual Length)/ (Immediate Set Length - 1))*100 |
|---|---|---|---|---|---|
| 2 | 25 | 62.5 | 56 (6 days) | 50 | 21 |
| 3 | 25 | 50 | 50 (7 days) | 50 | 0 |
| 4 | 40 | 93.8 | 81 (7 days) | 63 | 33 |
| 5 | 40 | 75 | 63 (7 days) | 50 | 33 |
| 5A | 40 | 75 | 75 (7 days) | 63 | 17 |
| 7 | 50 | 150 | 112.8 (8 days) | 75 | 50 |

TABLE 2-continued

| Sample No. | Temperature of Stretch Test, °C. | Immediate % Set | % Set After Aging (Time) | % Set After Heating in Oven for 2 min. At 85° C. | Total % Retraction - ((Immediate Set Length - Heat Actual Length)/ (Immediate Set Length - 1))*100 |
|---|---|---|---|---|---|
| 8 | 50 | 137.5 | 106 (7 days) | 63 | 55 |
| 9 | 50 | 131 | 87.5 (3 days) | 50 | 62 |
| 10 | 50 | 125 | 94 (3 days) | 50 | 60 |
| 12 | 60 | 187.5 | 150 (3 days) | 75 | 60 |
| 16 | 60 | 112.5 | 100 (18 hrs.) | 65° C. for 2 min. = 50; | 56 |
|  |  |  |  | then 85° C. for 2 min. = 31; | 72 |
|  |  |  |  | then 95° C. for 2 min. = 31 | 72 |
| 21 | 105 | 200 | 200 (16 hrs.) | 85° C. for 2 min. = 200; | 0 |
|  |  |  |  | then 90° C. for 2 min. = 200; | 0 |
|  |  |  |  | then 95° C. for 2 min. = 200; | 0 |
|  |  |  |  | then 100° C. for 2 min. = 200; | 0 |
|  |  |  |  | then 105° C. for 2 min. = 212.5 | Seemed to soften slightly |
| 22 | 105 | 200 | 200 (7 days) | Did not reheat |  |

Data in the Immediate % Set and % Set After Aging columns show that the films that were stretched at ambient temperature, 40° C., 50° C. and 60° C. are not immediately stable, but rather continue to retract for some time after they are relaxed. This time dependent retraction would have to be taken into account and accommodated in commercial operations using these films. However, surprisingly, the two specimens that were stretched at 105° C. are immediately dimensionally stable at their original stretched length. That is, they do not retract at all with time. Thus, commercial operations using these films would not be restricted due to film dimensional changes over time.

In addition, the data show that films stretched at ambient temperature, 40° C., 50° C. and 60° C. are heat unstable (or latent). That is, even after significant aging, they will retract further if they are heated at 85° C. for 2 minutes. If latency is desired, some of these films, especially those that were heat-set at 50° C. and 60° C. may have enough latent heat instability to be useful in commercial operations that require a latent elastic material. Again, very surprisingly, the heat stability of the films that were stretched and heat-set at 105° C., after sequential reheatings for 2 minutes, respectively at 85, 90, 95, and 100° C., did not retract at all from their original stretched length. Thus, this film is heat stable at temperatures below the glass transition temperature of the polystyrene hard phase.

Although a thermoplastic non-elastic block copolymer may be used in the method of this invention, thermoplastic block copolymers comprising an elastic soft phase are preferred. In accordance with a preferred embodiment of this invention, the thermoplastic block copolymer is a polystyrenic block copolymer. Other thermoplastic elastic block copolymers can be used. However, the temperatures employed in the method of this invention would require adjustment to accommodate the various glass transition temperatures and crystalline melting points. For thermoplastic non-elastic block copolymers, the temperatures employed would need to be adjusted to accommodate the various glass transition temperatures and crystalline melting points identified for the non-elastic block copolymers.

As previously stated, the stretch-thinned articles produced in accordance with the method of this invention are suitable for use in numerous durable and disposable articles, including diapers, incontinence wear, training pants, feminine care articles, etc and articles such as wound dressings, wipes, towels, napkins, and protective apparel. Depending upon the application, the stretch-thinned films produced in accordance with the method of this invention may be bonded to facing materials including wovens, nonwovens, knits, nets, foam-like materials, paper, and tissue, thereby forming a laminate structure. Bonding may be accomplished by any method known to those skilled in the art including thermo-bonding, adhesives, needle punching, ultrasonic bonding, hydro-entangling and hot melts. Laminates produced in accordance with one embodiment of this invention may themselves be non-stretchable or stretchable as desired. For example, to make stretchable laminates, the films of this invention can be laminated to extensible facing materials to produce laminates with stretch and recovery in the direction (s) that the extensible facing materials are extensible.

In accordance with one embodiment of this invention, the thermoplastic block copolymer comprises a filler, such as calcium carbonate particles, which produces a plurality of micropores during the stretch-thinning of the film, forming a breathable stretch-thinned film. Because the stretch-thinned film is dimensionally stable, the micropores do not close up during further processing of the film.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for producing a stretch-thinned elastic article having dimensional stability over time and at elevated temperatures comprising the steps of:

melt-processing a thermoplastic block copolymer having a hard phase and an elastic soft phase into an article;

conditioning said article at an elevated temperature one of greater than and equal to a glass transition temperature ($T_g$) of said hard phase of said thermoplastic block copolymer;

stretch-thinning said article at said elevated temperature to a desired percentage stretch, forming a stretch-thinned article; and cooling said stretch-thinned article in a stretched state to a temperature below said glass transition temperature of said hard phase of said thermoplastic block copolymer, wherein the cooled stretch-thinned article has a percentage set about equal to the percentage stretch at the elevated temperature, and has stretch and recovery elastic properties.

2. A method in accordance with claim 1, wherein said article is a film.

3. A method in accordance with claim 2, further comprising bonding a facing material to at least one side of said stretch-thinned film, forming a laminate.

4. A method in accordance with claim 3, wherein said facing material is selected from the group consisting of wovens, nonwovens, knits, nets, foam material, paper, and tissue.

5. A method in accordance with claim 3, wherein said facing material is bonded to said stretch-thinned film by a method selected from the group consisting of thermal bonding, adhesives, needle punching, ultrasonic bonding, hydro-entangling and hot melts.

6. A method in accordance with claim 2, wherein said film is stretched in at least one of a machine direction and a cross-machine direction.

7. A method in accordance with claim 1, wherein said article is a fiber.

8. A method in accordance with claim 1, wherein said stretch-thinned article is further conditioned at said elevated temperature prior to said cooling.

9. A method in accordance with claim 1, wherein said thermoplastic block copolymer comprises a filler.

10. A method in accordance with claim 9, wherein said filler produces a plurality of micropores during said stretch-thinning, forming a breathable stretch-thinned article.

11. A method in accordance with claim 1, wherein said thermoplastic block copolymer is a styrenic block copolymer.

12. A method in accordance with claim 1, wherein said thermoplastic block copolymer is a styrenic block copolymer.

* * * * *